March 26, 1946.    J. E. SHAFER    2,397,164
SELF-ALIGNING BEARING ASSEMBLY
Filed March 8, 1943
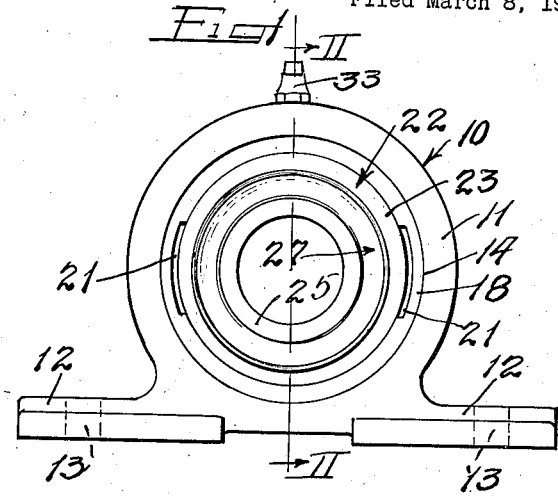
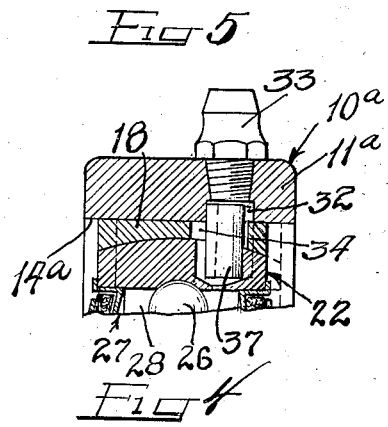
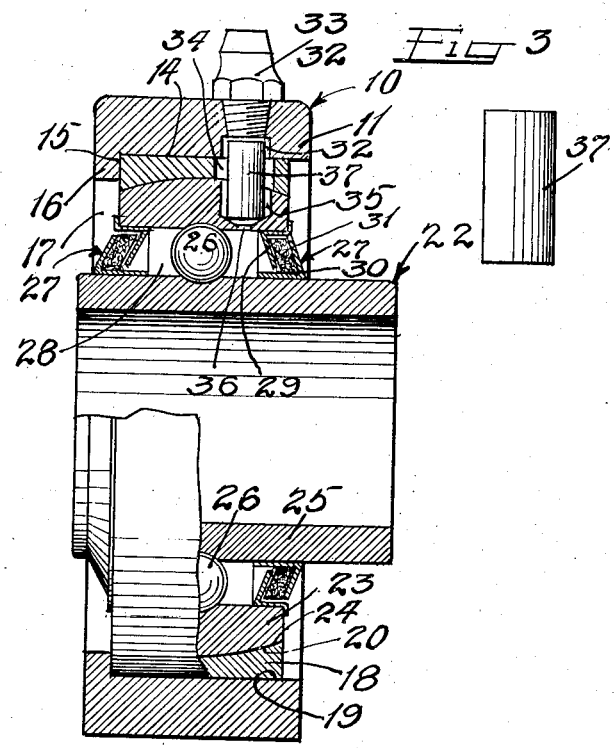
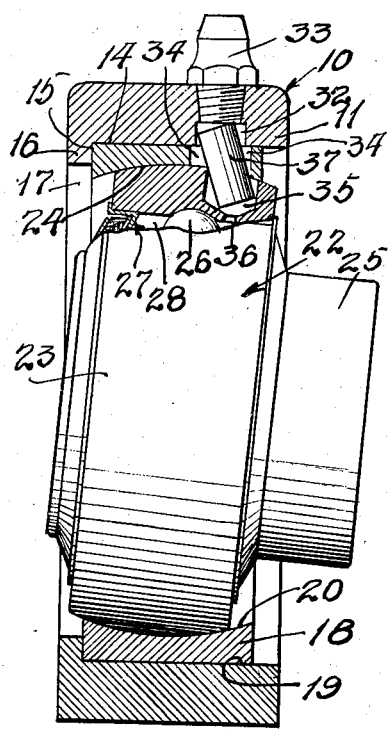
Inventor
Julius E. Shafer.
by
Atts.

Patented Mar. 26, 1946

2,397,164

UNITED STATES PATENT OFFICE 2,397,164

SELF-ALIGNING BEARING ASSEMBLY

Julius E. Shafer, Chicago, Ill.

Application March 8, 1943, Serial No. 478,348

2 Claims. (Cl. 308—72)

This invention relates to bearing assemblies composed of a housing, an adapter ring, and a bearing unit, wherein a pin holds all three of the members in proper aligned relationship while permitting a limited degree of movement between the members.

Specifically, the invention relates to bearing assemblies composed of pillow blocks, adapter rings, and bearing units, wherein a lubricant-conveying locking pin arrangement holds all of the members of the assembly in proper alignment so that lubricant can always be conveyed to the interior of the bearing unit from outside of the pillow block.

This invention is especially well adapted for lightweight installations wherein a bearing housing such as a pillow block or the like can be composed of a very lightweight metal such as magnesium, aluminum or the like. Such metals are very soft and do not provide good wearing bearing surfaces. Further, they have a tendency to seize a bearing member when loaded. According to this invention the housing or pillow block receives an adapter ring that is impregnated with a lubricant. Sintered powdered iron of about 35% porosity and soaked in oil to contain about 35% oil by volume is an excellent material for adapter rings in installations of this invention. The material is known commercially as "Oilite."

The adapter ring is mounted in the pillow block and, due to the oil impregnated therein, it is free to move relative to the pillow block without danger of seizing. The adapter ring has a concave interior annular wall receiving the outer race ring of a sealed bearing unit. The outer race ring is convex and is free to tilt on the concave inner wall of the adapter ring.

The pillow block and the adapter ring have holes therethrough while the outer race ring of the sealed bearing unit has a closed perimeter dimple therein joined by a small bore with the interior of the bearing unit. The adapter ring hole is somewhat larger than the dimple and the hole in the pillow block. A locking pin is bottomed in the dimple and is long enough to extend through the hole in the adapter ring into the hole in the pillow block. The pin is smaller than the dimple and hole and is adapted to be cocked therein. A lubricant fitting can be secured to the pillow block and lubricant will flow from the fitting around or through the pin into the interior of the bearing unit. Therefore, the pin holds the adapter ring and pillow block in proper alignment with the lubricant fitting. By being smaller than the holes in which it is seated, the adapter ring can move relative to the pillow block to act as a shaft aligner while the bearing unit can move in the adapter ring to a limited extent.

It is, then, an object of this invention to provide a very lightweight bearing assembly including a housing of non-bearing material such as magnesium, aluminum, and the like, an oil-impregnated metal adapter ring, and a sealed bearing unit, all of which members are held together in proper seated aligned relation by a locking pin.

A further object of the invention is to provide a bearing assembly including a housing, an adapter ring, and a bearing unit equipped with lubricant passageways and receiving in said passageways a locking pin which holds all of the passageways in communication while permitting relative movement between the members.

Another object of the invention is to provide lubricant-conveying locking means for bearing assemblies including adapter rings.

A specific object of the invention is to provide a lightweight pillow block bearing assembly having an oil-impregnated porous metal adapter ring between the pillow block and the bearing unit whereby the pillow block can be composed of non-bearing metal.

A still further object of the invention is to provide a bearing assembly composed of a housing, an adapter ring, and a sealed bearing unit, with a combined lubricant supply means and locking means so that lubricant can be conveyed to the interior of the sealed bearing unit from the outside of the pillow block.

A still further object of the invention is to provide a self-aligning bearing assembly including an adapter ring between a housing and a bearing unit together with a lubricant-supplying locking means permitting relative movement between the parts without being damaged.

Other and further objects of the invention will be apparent to those skilled in the art from the following detailed description of the annexed sheet of drawings which, by way of preferred examples, illustrates several embodiments of the invention.

On the drawing:

Figure 1 is a side elevational view of a self-aligning bearing assembly according to this invention.

Figure 2 is an enlarged vertical cross-sectional view, with parts in elevation, taken along the line II—II of Figure 1.

Figure 3 is an enlarged elevational view of a locking pin shown in Figure 2.

Figure 4 is a view similar to Figure 3 illustrating the bearing unit in cocked position to show the extent of tilting of the bearing unit in the adapted ring.

Figure 5 is a fragmentary vertical cross-sectional view similar to Figure 2 but illustrating a modified type of pillow block which does not carry end thrust loads.

As shown on the drawing:

In Figures 1, 2 and 4 the reference numeral 10 designates generally a one-piece pillow block having an annular strap portion 11 with integral laterally extending feet portions 12 on the bottom thereof. The feet portions 12 have slots or holes 13 therethrough for receiving mounting studs or bolts to rigidly attach the pillow block to a supporting structure which is not shown.

The strap portion 11 of the pillow block 10 has a cylindrical bore 14 extending from one face thereof into spaced relation from the other face thereof as best shown in Figure 4. The cylindrical bore 14 terminates in a shoulder 15 providing an inturned portion 16 at the opposite face of the strap. The inturned portion 16 provides a reduced circular opening 17 at this opposite face.

The strap portion 11 of the pillow block receives, in the cylindrical bore 14 thereof, a one-piece adapter ring 18 having a cylindrical outer wall 19 and a concave inner wall 20. The outer wall 19 fits on the wall 14 of the pillow block in movable bearing relation therewith and the adapter ring 18 is bottomed on the shoulder 15 of the pillow block.

The pillow block 10 is in one piece and is preferably composed of very lightweight metal such as magnesium or aluminum. If desired, however, the pillow block could be composed of iron or other metal. If the metal used for the pillow block does not have good bearing properties it is preferred that the adapter ring 18 be composed of an oil-impregnated porous metal which will prevent seizure between the walls 14 and 19. A suitable metal is sintered powdered iron soaked in oil and known commercially as "Oilite."

The adapter ring 18 has diametrically opposed slots or grooves 21 across the convex inner face 20 thereof as shown in Figure 1.

A sealed bearing unit 22 has an outer race ring 23 with a convex outer wall portion 24 seated on the concave inner wall portion 20 of the adapter ring. The sealed bearing unit 22 is adapted to be held in horizontal position and slid into the grooves 21 of the adapter ring. It can then be tilted into vertical position to be seated on the bearing wall 20 of the adapter ring. When so seated the unit is held in the bearing ring by cooperation between the concave wall 20 and the convex wall 24.

The sealed bearing unit 22 also has an inner bearing ring 25 adapted to be disposed around the shaft for carrying the shaft. A row of ball bearings 26 between the inner ring 25 and the outer ring 23 rotatably carries the inner ring 25.

Bearing seals 27 are provided on each side of the row of ball bearings 26 to cooperate with the inner and outer rings 25 and 23 for forming a sealed bearing chamber 28.

Each seal 27 can be composed of a retainer 29 pressed into the outer race ring 23 and a flinger 30 pressed onto the inner race ring 25. A felt washer 31 is carried by the flinger and is held in closely spaced relation to the retainer 29.

The top portion of the strap 11 has a radial bore 32 therethrough communicating with the inner face 14 of the ring and tapped at the outer portion thereof to receive, in threaded relation therein, a lubricant fitting 33 which terminates in spaced relation from the end of the bore 32, as best shown in Figures 2 and 4.

The adapter ring 18 has a radial bore 34 therethrough of somewhat larger diameter than the bore 32.

The outer race ring 23 of the bearing unit 22 has a closed perimeter dimple, well or depression 35 therein extending from the concave face 24 into spaced relation from the interior of the ring and joined through a small bore 36 with the bearing chamber 28 in spaced relation from the raceway on which the row of balls 26 ride.

The dimple 35 has a diameter about the same as the diameter of the bore 32 and is thus smaller than the bore 34 of the adapter ring.

A locking pin 37 preferably composed of a cylindrical metal rod of smaller diameter than the bore 32 and dimple 35 is bottomed in the dimple 35 and extends through the bore 34 of the adapter ring into the bore 32 of the pillow block. This locking pin is thus loosely fitted in the bore and dimple and lubricant from the fitting 33 can flow around the pin through the bores 32 and 34 into the dimple 35 and thence through the small bore 36 into the interior of the bearing chamber 28. Thus the locking pin holds the bores in alignment and makes possible the lubrication of the sealed bearing unit from outside of the pillow block. Since the pin 37 is of smaller diameter than the bore of the dimple, the adapter ring can move circumferentially and longitudinally to a limited degree in the pillow block while the bearing ring can tilt to a limited degree in the adapter ring. As shown in Figure 4 the bearing unit can tilt or cock to an appreciable angle without even stressing the locking pin 37. The bore 34 of the adapter ring, by being larger than the bore 32 and the dimple 35, permits wide angulation of the bearing unit without hindering movement or cocking of the pin.

The adapter ring 18 is adapted to thrust against the shoulder 15 so that the pillow block 10 can carry thrust loads.

As shown in Figure 5, a modified pillow block 10a has an annular strap portion 11a with a straight cylindrical bore 14a extending completely therethrough. The adapter ring 18 will not have any shoulder to thrust against and, in this installation, the pillow block will not be a thrust-load carrying member. The adapter ring 18, as shown in dotted lines, can move axially of the pillow block to act as a shaft aligner and in so moving, of course, will carry the bearing unit 22 therewith. The pin, by being loosely received in the bore 34 of the adapter ring, of course, will permit appreciable movement of the ring.

From the above descriptions it will be understood that this invention provides a self-aligning bearing assembly including a shiftable adapter ring and a tiltable sealed bearing unit seated in a fixed pillow block or other housing. Anti-friction elements in the sealed bearing unit can always receive lubricant from a fitting mounted on the housing. The locking pin arrangement, while insuring supply of lubricant to the sealed bearing chamber, permits universal movement of the bearing unit in its adapter ring and permits sliding movement of the adapter ring in its housing to a limited extent.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A bearing assembly including a pillow block having a cylindrical bore therein, a self-lubricating adapter ring seated in the bore of said pillow block and being free to both rotate and move axially relatively to said pillow block, said adapter ring having a concave inner wall, a bearing unit in said adapter ring and having a convex outer wall tiltable on the concave inner wall of the adapter ring, said bearing unit having a dimple therein, said adapter ring having a bore therethrough, said pillow block also having a radial bore therein, and a locking pin loosely seated in said dimple and adapter ring bore and said radial bore to hold the parts of the assembly in proper relationship while permitting limited rotational movement of the parts and limited relative axial movement of the adapter ring relative to the pillow block.

2. A bearing assembly including a pillow back having a cylindrical bore therein, a self-lubricating adapter ring seated in the bore of said pillow block and being free to both rotate and move axially relatively to said pillow block, a bearing unit in said adapter ring, said bearing unit having a dimple therein, said adapter ring having a bore therethrough, said pillow block also having a radial bore therein, and a locking pin loosely seated in said dimple and adapter ring bore and said radial bore to hold the parts of the assembly in proper relationship while permitting limited relative rotational movement of the parts and limited axial movement of the adapter ring relative to the pillow block.

JULIUS E. SHAFER.